United States Patent
Kinzli

(10) Patent No.: US 9,599,125 B1
(45) Date of Patent: Mar. 21, 2017

(54) TO ADJUSTABLE WALL MOUNT RETAINING MEMBERS TO ADJUST THE HEIGHT OF A WALL MOUNTED FAN AND RELATED METHODS

(71) Applicant: Arthur Kinzli, Costa Mesa, CA (US)

(72) Inventor: Arthur Kinzli, Costa Mesa, CA (US)

(*) Notice: Subject to any disclaimer, the term of this patent is extended or adjusted under 35 U.S.C. 154(b) by 0 days.

(21) Appl. No.: 15/255,007

(22) Filed: Sep. 1, 2016

Related U.S. Application Data

(63) Continuation-in-part of application No. 15/153,601, filed on May 12, 2016.

(51) Int. Cl.
| | |
|---|---|
| *F16M 1/00* | (2006.01) |
| *F04D 29/64* | (2006.01) |
| *F04D 25/08* | (2006.01) |
| *F16M 13/02* | (2006.01) |
| *F16M 11/18* | (2006.01) |
| *A01G 9/24* | (2006.01) |

(52) U.S. Cl.
CPC .......... *F04D 29/644* (2013.01); *A01G 9/246* (2013.01); *F04D 25/08* (2013.01); *F16M 11/18* (2013.01); *F16M 13/02* (2013.01); *F05B 2240/911* (2013.01); *F05B 2260/30* (2013.01)

(58) Field of Classification Search
USPC .......................................................... 248/669
See application file for complete search history.

(56) References Cited

U.S. PATENT DOCUMENTS

| | | | | |
|---|---|---|---|---|
| D295,070 S | * | 4/1988 | Shin-Chin | .................... D23/382 |
| 5,403,162 A | * | 4/1995 | Chen | ..................... F04D 25/166 |
| | | | | 248/125.1 |
| D435,899 S | * | 1/2001 | Melwani | ...................... D23/382 |
| 7,293,456 B1 | * | 11/2007 | Trogdon | ................ G01D 11/30 |
| | | | | 73/178 R |
| 7,730,663 B2 | * | 6/2010 | Souvlos | ............... A01G 31/047 |
| | | | | 47/62 C |
| 7,857,274 B1 | * | 12/2010 | Parks | ................... A01K 1/0356 |
| | | | | 248/230.1 |
| 2014/0112791 A1 | * | 4/2014 | Abell | .................... F04D 25/084 |
| | | | | 416/159 |
| 2015/0259636 A1 | * | 9/2015 | Niederbacher | ..... B01F 7/00741 |
| | | | | 435/289.1 |

* cited by examiner

*Primary Examiner* — Monica Millner
(74) *Attorney, Agent, or Firm* — Buche & Associates, P.C.; John K. Buche; Bryce A. Johnson

(57) ABSTRACT

The present invention is a method for attaching a fan to a wall at various locations using an adjustable mounting plate and support for an adjustable mounting plate. The method disclosed herein allows a user to affix a fan to the adjustable mounting plate on a wall at a multitude of different heights desired by the user and to further re-affix to a new desired height both quickly and easily.

10 Claims, 22 Drawing Sheets

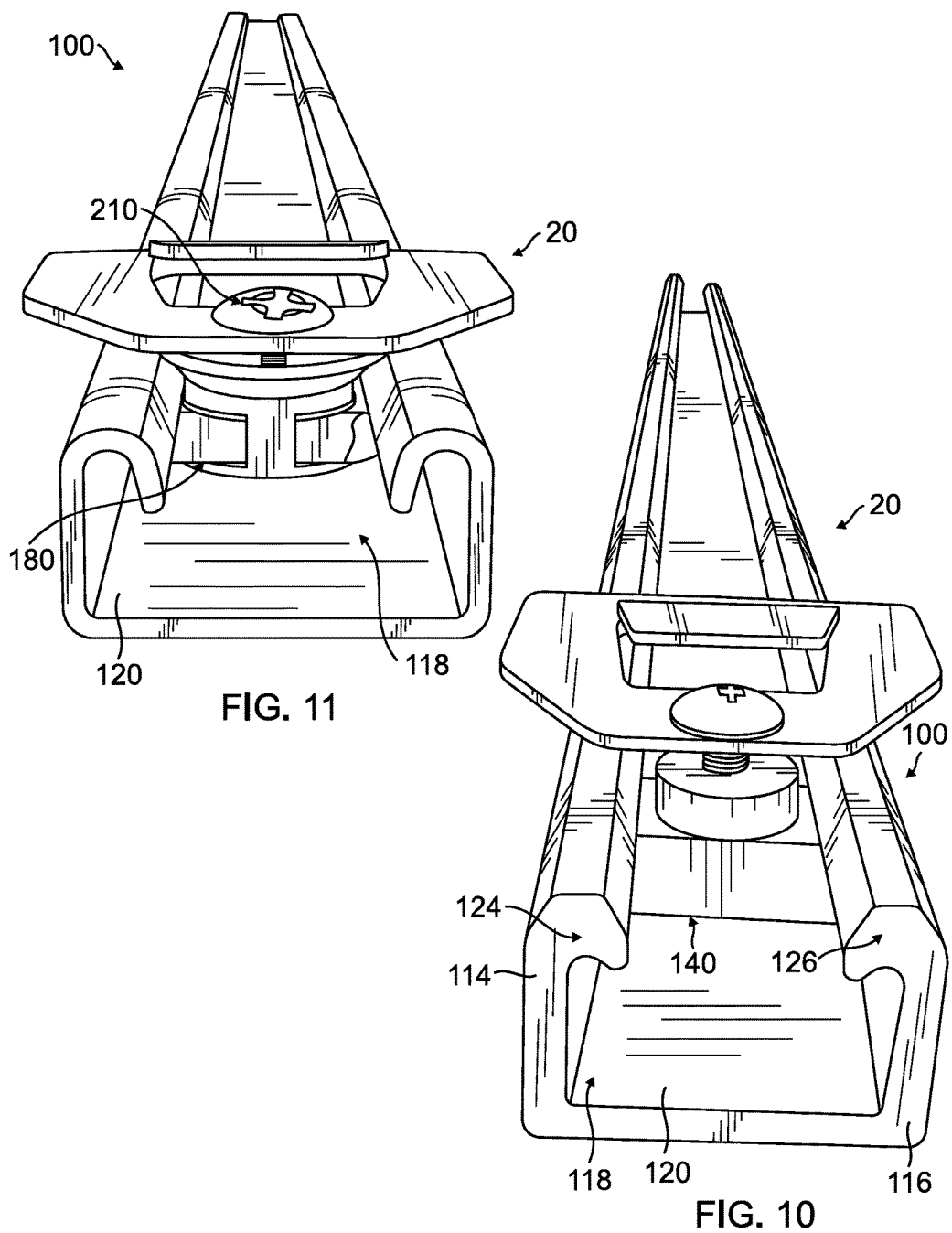

TO ADJUSTABLE WALL MOUNT RETAINING MEMBERS TO ADJUST THE HEIGHT OF A WALL MOUNTED FAN AND RELATED METHODS

CROSS-REFERENCE TO RELATED APPLICATIONS

This application is a continuation-in-part of U.S. patent application Ser. No. 15/153,601 (filed May 12, 2016) entitled Adjustable wall mount retaining member to adjust the height of a wall mounted fan."

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND AN INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The present invention relates to the field of air circulation systems. Specifically, this invention relates to air circulation fans used in conjunction with a mounting structure.

Description of the Prior Art

To the best of the present inventor's knowledge, there are no prior patents that disclose the present invention.

There is significant need for an improved adjustable mounting bracket method to affix a fan to a multitude of different elevations along a wall mounted structure.

SUMMARY OF THE INVENTION

The present invention is at least one adjustable mounting bracket and channel mounting assembly affixed to an interior wall of an enclosure in a structure to provide a vertical channel member to which the mounting bracket is removably affixed to enable the mounting bracket to be positioned along different vertical heights. The mounting bracket retains a cooling and air circulation member selected from the group consisting of a fan, an oscillating fan, and a cooling tower. The ability to adjust the vertical location of the mounting bracket along the vertical channel facilitates adjusting the vertical height location of the cooling and air circulation member.

Specifically, this invention relates to an adjustable mounting bracket which retains a fan and works in conjunction with a structure that is affixed to a wall or mounting surface. The adjustable mounting bracket used in conjunction with the structure allows the mounting bracket to be affixed at various elevations along a wall for purposes of affixing a fan to the adjustable mounting bracket. This allows a fan to be affixed at any desired elevational along the wall.

The present invention is a method for attaching a fan to a wall at various locations using an adjustable mounting plate and support for an adjustable mounting plate. The method disclosed herein allows a user to affix a fan to the adjustable mounting plate on a wall at a multitude of different heights desired by the user and to further quickly and easily re-affix the fan to a new desired height.

Horticulture is the branch of agriculture that deals with the art, science, technology, and business of growing plants. It includes the cultivation of plants, fruits, vegetables, nuts, seeds, herbs, sprouts, mushrooms, algae, flowers, seaweeds and non-food crops such as grass and ornamental trees and plants. It also includes plant conservation, landscape restoration, landscape and garden design, construction, and maintenance, and arboriculture. Inside agriculture, horticulture contrasts with extensive field farming as well as animal husbandry.

Horticulturists apply their knowledge, skills, and technologies used to grow intensively produced plants for human food and non-food uses and for personal or social needs. Their work involves plant propagation and cultivation with the aim of improving plant growth, yields, quality, nutritional value, and resistance to insects, diseases, and environmental stresses. Horticulturists have found that the cultivation or growing of plants indoors has numerous benefits. First, the horticulturist has greater control over the internal atmospheric conditions that affect the growth of the plant. These conditions that can be set to optimum conditions for growth include but are not limited to temperature, humidity, amount of light, amount of oxygen, and amount of carbon dioxide. A major factor in the growing of plants indoors is the amount of air circulation and more specifically the amount of oxygen and carbon dioxide that a plant is receiving. As the plant grows, the height of the air cooling and air circulation member such as the fan must be adjusted so that the fan is at least level with or above the height of the plants.

To effectively control the amount of air that a plant is receiving when growing indoors, it is beneficial to raise or lower the height of a fan to correspond to a plants or group of plants height that is being grown. It is an object of the present invention to provide a method for raising or lowering the vertical position of a fan along a wall in an easy manner. This method disclosed herein includes affixing a structure to a wall and an adjustable mount affixed to the structure which adjustable mount retains a fan and a method and apparatus to quickly and easily raise or lower the vertical location of the mount.

It is also an object of the present invention to have different support structure embodiments. These embodiments for the support structure include a circular tube, a rectangular shaped tube, and a channel bracket that is affixed to the wall by means of screws, bolts, or mount screws. It is also within the spirit and scope of this invention to have tube end plugs, saddle spacers, and tube wall screws used in the support structure. Further, the tube maybe one piece or multiple pieces that can fit together by means of press fitting, threaded ends, or other standard affixable means.

It is an additional object of the present invention to provide different embodiments for the retaining members that affix the adjustable mounting plate to the structure. Working in conjunction with the elongated or circular tube are retaining cylinders that traverse vertically up and down along the tube which can be either affixed to the adjustable mounting plate or affixed by additional screws. The adjustable mounting plate may also be affixed to the tube by means of a clutch.

It is a further object of the present invention for a channel nut to fit inside and work in conjunction with the channel bracket, machine screws, and the adjustable mounting plate to allow a user to affix a fan at any vertical location along the channel bracket with the channel bracket traversing vertically up and down a wall. For installation purposes, the flange must be in the up position when affixed to the wall and the top of the structure should be affixed first.

It is still a further object of the present invention to provide a method for affixing an adjustable fan to a wall and allow a user to quickly and easily adjust the vertical height of the fan from a first height or location to a second and different height or location. The methods contained herein disclose multiple embodiments for both the structure along the wall and the means by which the location of the fan is adjusted. What is consistent throughout is the means by which the fan base is attached to the mounting bracket. There is a female receptacle located on the base of the fan which receives a male retaining member on the mounting plate and allows the male retaining member to interlock with the female retaining member.

Further novel features and other objects of the present invention will become apparent from the following detailed description, discussion and the appended claims, taken in conjunction with the drawings.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 10 is a cross sectional view of the adjustable male mounting plate affixed to a channel bracket by channel nut and threaded bolt;

FIG. 11 is a cross sectional view of the adjustable male mounting plate affixed to a channel bracket by circular spacer channel nut and threaded bolt;

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
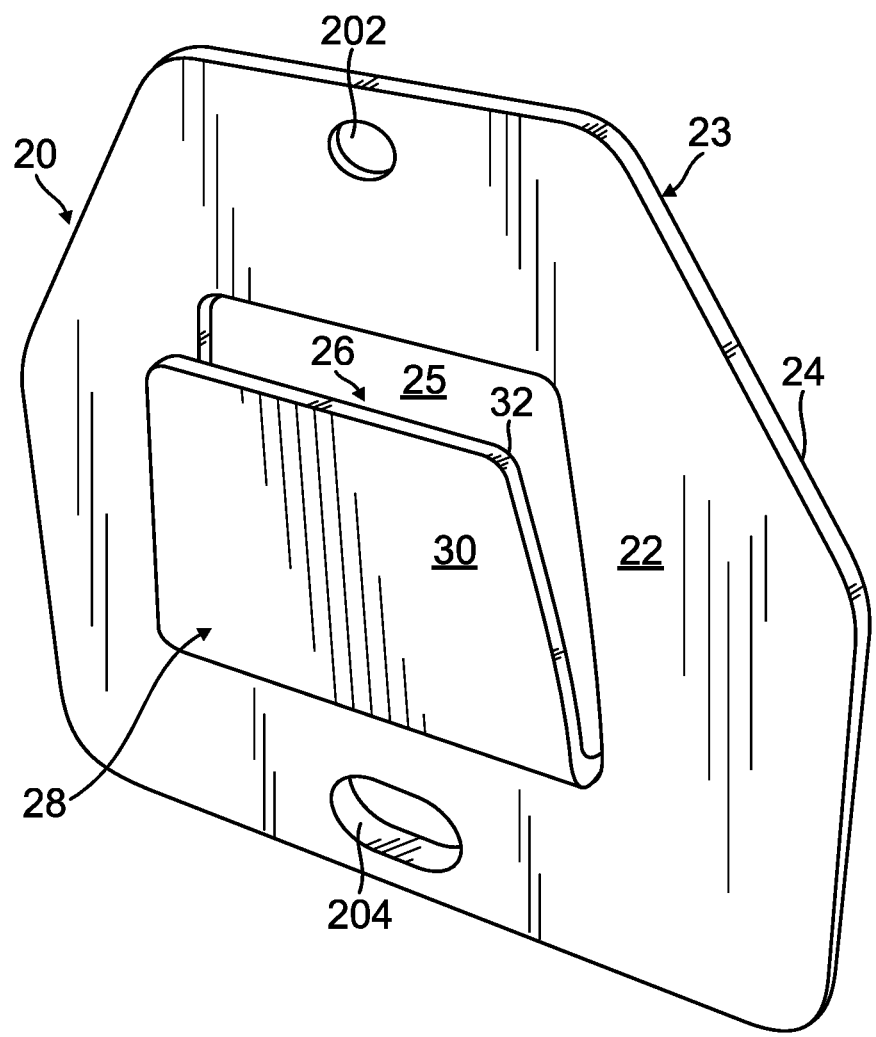
FIG. 1 is a front elevational view of a male mounting plate.

Referring to FIG. 1, there is illustrated a male mounting plate 20 having a main male vertical plate 23 which has a first male front surface 22, a first male rear surface 24, a top hole 202, a bottom hole 204, a male retaining member 28 formed from a second male front surface 30 and a second male rear surface 32 extending away from first male front surface 22 at angle è, a central open chamber 26 formed from first male front surface 22 and second male rear surface 32. The main male vertical plate 23 includes a cut out opening 25 in one embodiment, the cut out opening 25 is sized to conform to the shape of male retaining member 28.

Figure 2:
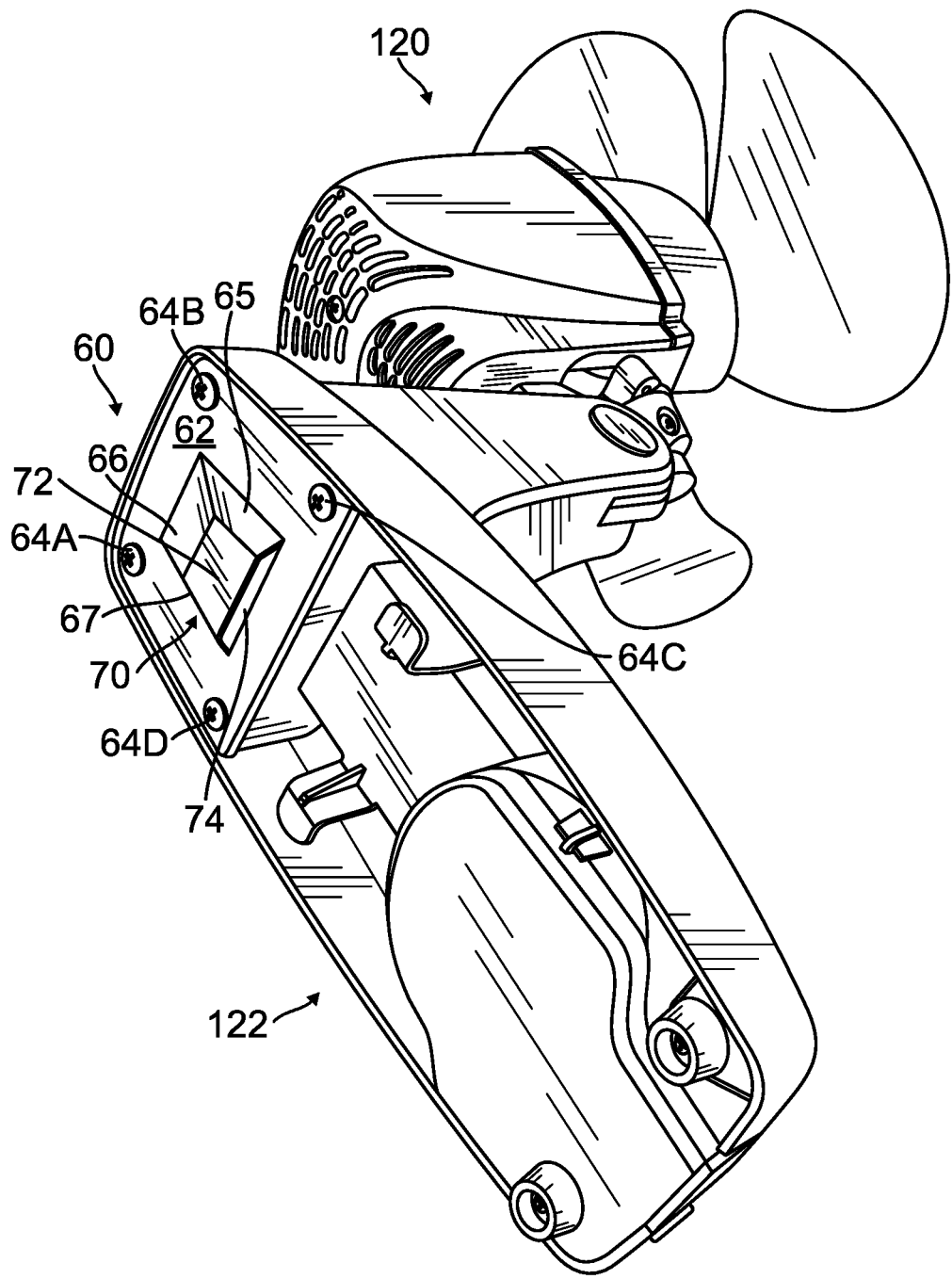
FIG. 2 is a rear elevational perspective view of a female mounting plate affixed to the back of a fan (with the protective around the fan blade removed)

Referring to FIG. 2, there is illustrated a female mounting plate 60 which attaches to fan bottom 122 of fan 120. Not shown in this Figure is the protective fan cage which surrounds the blades of these fans. Female mounting plate 60 has a first female vertical surface 62 and a female retaining member 70 which is formed from a first trapezoidal shaped wall 65, a second trapezoidal shaped wall 66, and a third trapezoidal shaped wall 67 that extend outward from first female vertical surface 72 and adjoin a second female vertical surface 72 forming an interior chamber 74 where male retaining member 28 can be inserted and retained.

Figure 3:
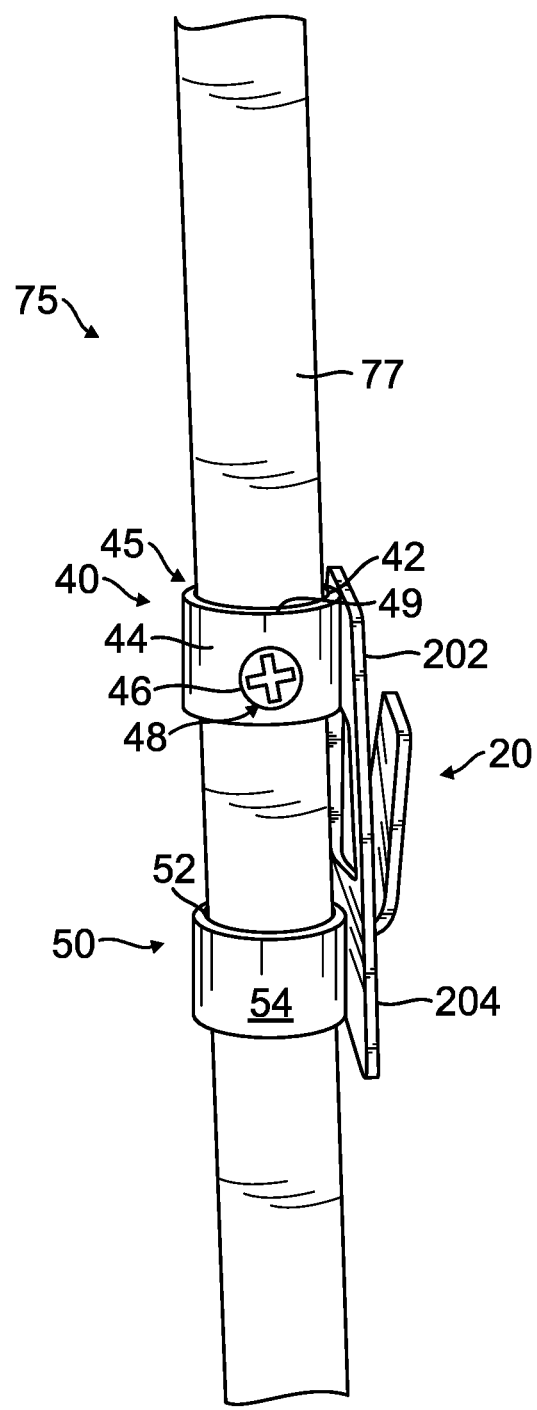
FIG. 3 is a side elevational view of a male mounting plate affixed to retaining cylinders that are adjustable affixed to a circular tube.

Referring to FIG. 3, there is illustrated a male mounting plate 20 affixed to a top retaining cylinder 40 and affixed to a bottom retaining cylinder 50. The means of affixing male mounting plate 20 to top retaining cylinder 40 and bottom retaining cylinder 50 is by means of welding or spot welding. Top retaining cylinder 40 has an interior cylindrical wall 42, an exterior cylindrical wall 44, and cylindrical chamber 45 by which top retaining cylinder and bottom retaining cylinder can slide vertically along elongated tube 75. Further illustrated in FIG. 3, is a top cylinder hole 46 that passes through interior cylindrical wall 42 and exterior cylindrical wall 44. Top affixing member 48 can then be used in conjunction with top cylinder hole 46 and elongated tube 75 to removably affix top retaining cylinder 40 to a desired vertical height along elongated tube 75 (and thereby affixing as well bottom retaining cylinder and male mounting plate 20 to relatively the same vertical height because these pieces are affixed together). Top affixing member 48 can be tightened so that a top distal end 49 of top affixing member 48 comes in contact and presses against exterior circumferential sidewall 77 of elongated tube 75. The tightening force applied to top affixing member 48 retains top retaining cylinder 40, bottom retaining cylinder 50, and male mounting plate 20 affixed along elongated tube 75. Similarly, top affixing member 48 can be loosened to allow top retaining cylinder 40, bottom retaining cylinder 50, and male mounting plate 20 to slide vertically along elongated tube 75 to a new desired location and then be affixed by tightening top affixing member 48. By way of example, top affixing member 48 is selected from the group consisting of a threaded bolt, a press fit bolt, set screw and a threaded screw.

Figure 4:
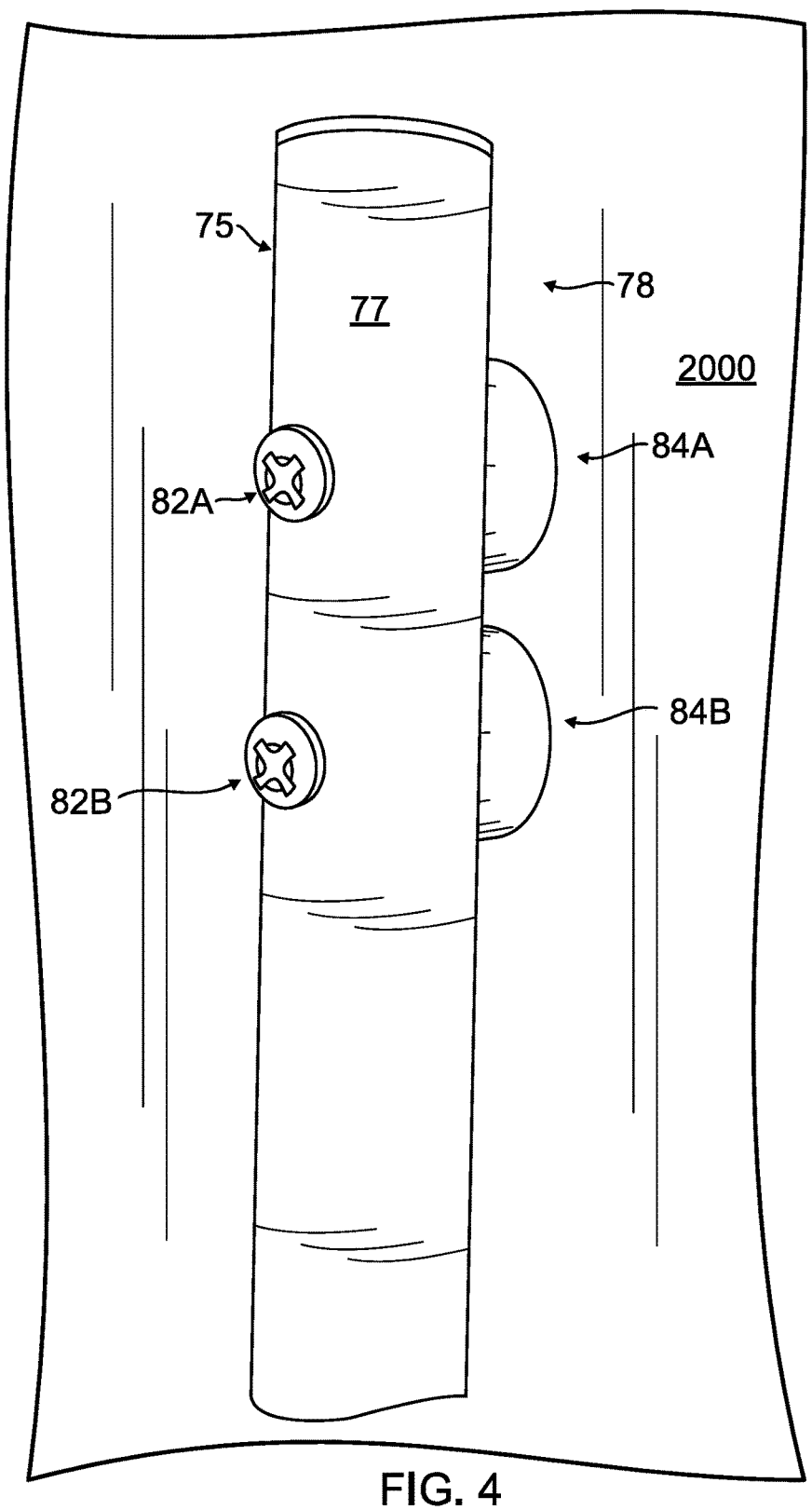
FIG. 4 is a front elevational perspective view of a circular tube being affixed to a wall by use of tube wall screws and spacers.
Figure 5:
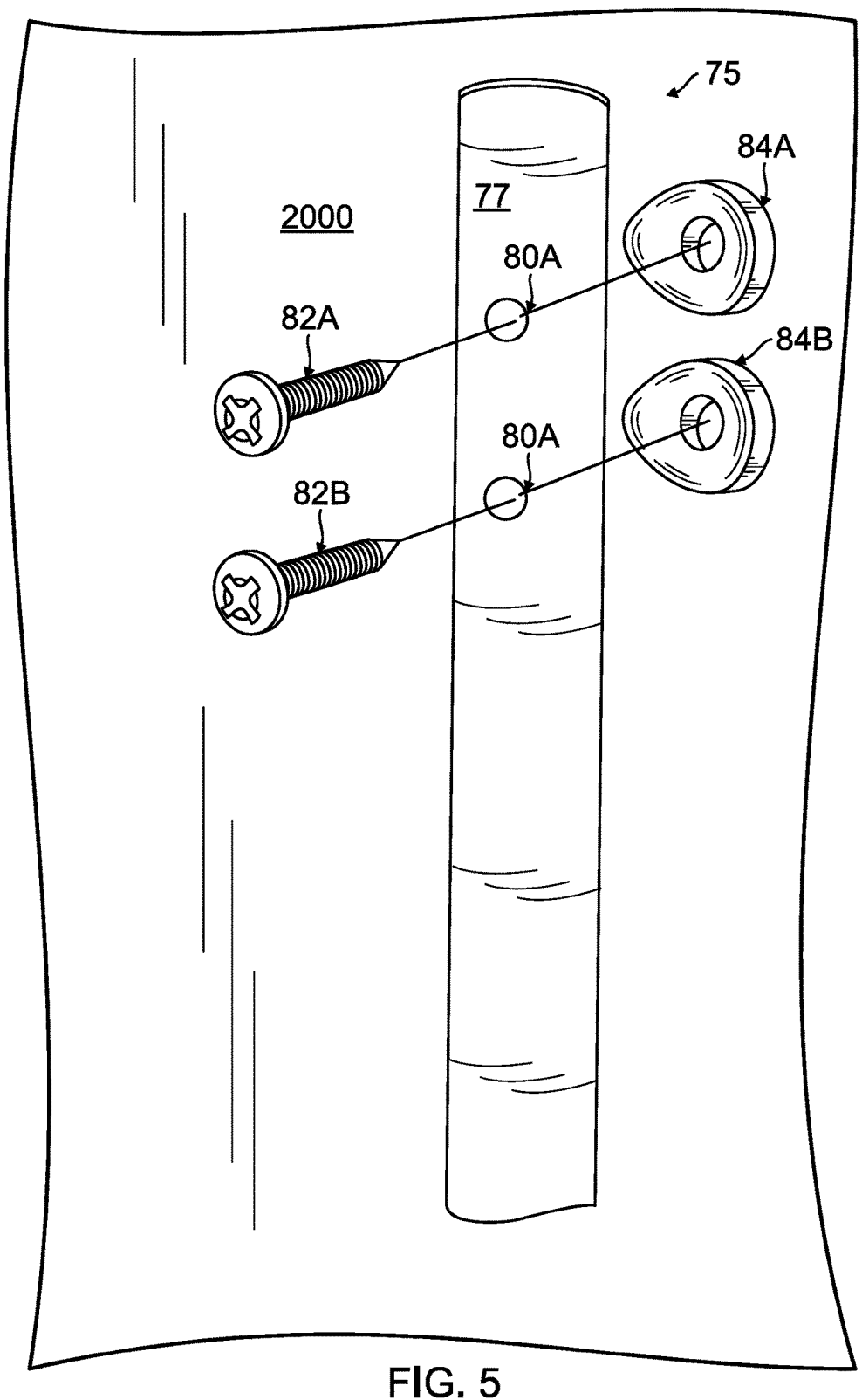
FIG. 5 is an exploded front elevational view of a circular tube being affixed to a wall by use of tube wall screws and spacers.

Referring to FIGS. 4 and 5, there is illustrated a top portion 78 of elongated tube 75 that is affixed to mounting surface or wall 2000 (this term will be called out as wall 2000 however mounting surface is within the spirit and scope of this invention) by means of screws 82A and 82B and spacers 84A and 84B. Screws 82A and 82B fit respectively through holes 80A and 80B of elongated tube 75 and then through holes in center of spacers 84A and 84B. Spacers 84A and 84B aid in retaining elongated tube 75 to wall 2000 by providing a transition from a flat surface to a curved surface. Not shown in FIGS. 4 and 5 is the bottom of elongated tube 75 which contain affixing screws, holes, and spacers identical to top portion 78 of elongated tube 75.

Figure 6:
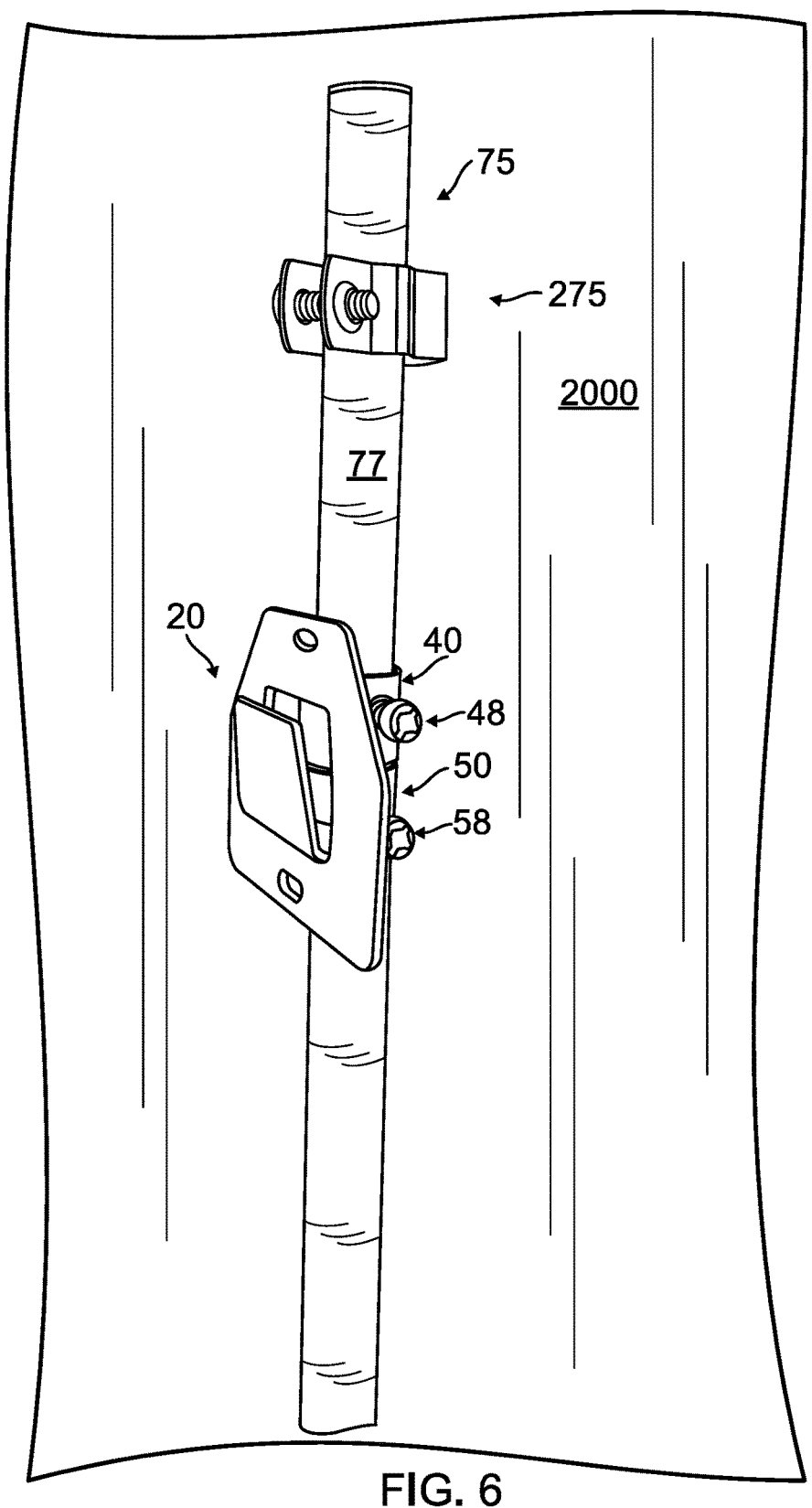
FIG. 6 is front elevational perspective view of the male mounting plate affixed to retaining cylinders that are adjustably affixed to a circular tube with the circular tube affixed to a wall using a clamp.

Referring to FIG. 6, there is illustrated an alternative means to affix elongated tube 75 to wall 2000. In this embodiment tube mounting clamp A 275 is used to affix elongated tube 75 to wall 2000. Two tube mounting clamps would be used (one at the top and one at the bottom of elongated tube 75). Further shown in FIG. 6 is top retaining cylinder 40 and bottom retaining cylinder 50. Similar to the first embodiment, top retaining cylinder 40 is affixed (this could be done by spot welding but is not limited to this affixation method) to male mounting plate 20. This embodiment though also includes a bottom retaining cylinder 50 which is also affixed male mounting plate 20. Working in conjunction with elongated tube 75 male mounting plate 20 is moveably affixed to elongated tube 75 by tightening or loosening top affixing member 48 and bottom affixing member 58. Further shown in FIG. 6 is tube mounting clamp A 275 which may be used to affix elongated tube 75 to wall 2000.

Figure 7:
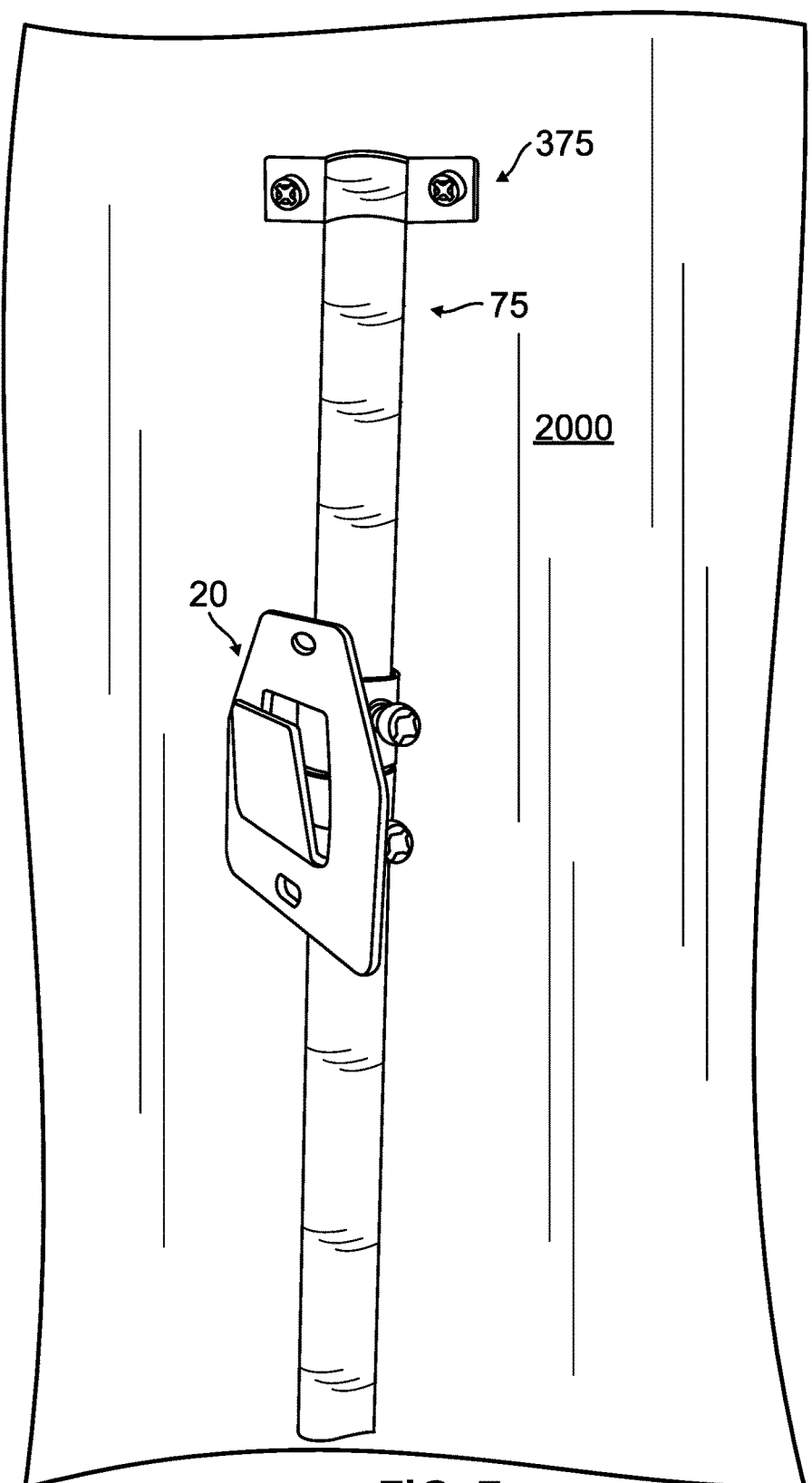
FIG. 7 is front elevational perspective view of a male mounting plate affixed to retaining cylinders that are adjustably affixed to a circular tube with the circular tube affixed to a wall using a saddle clamp.

Referring to FIG. 7, there is illustrated another embodiment of a means to affix elongated tube 75 to wall 2000. Shown in FIG. 7 is tube mounting clamp B which also can be used to affix elongated tube 75 to wall 2000. Two tube mounting clamps would be used (one at the top and one at the bottom of elongated tube 75).

Figure 8:
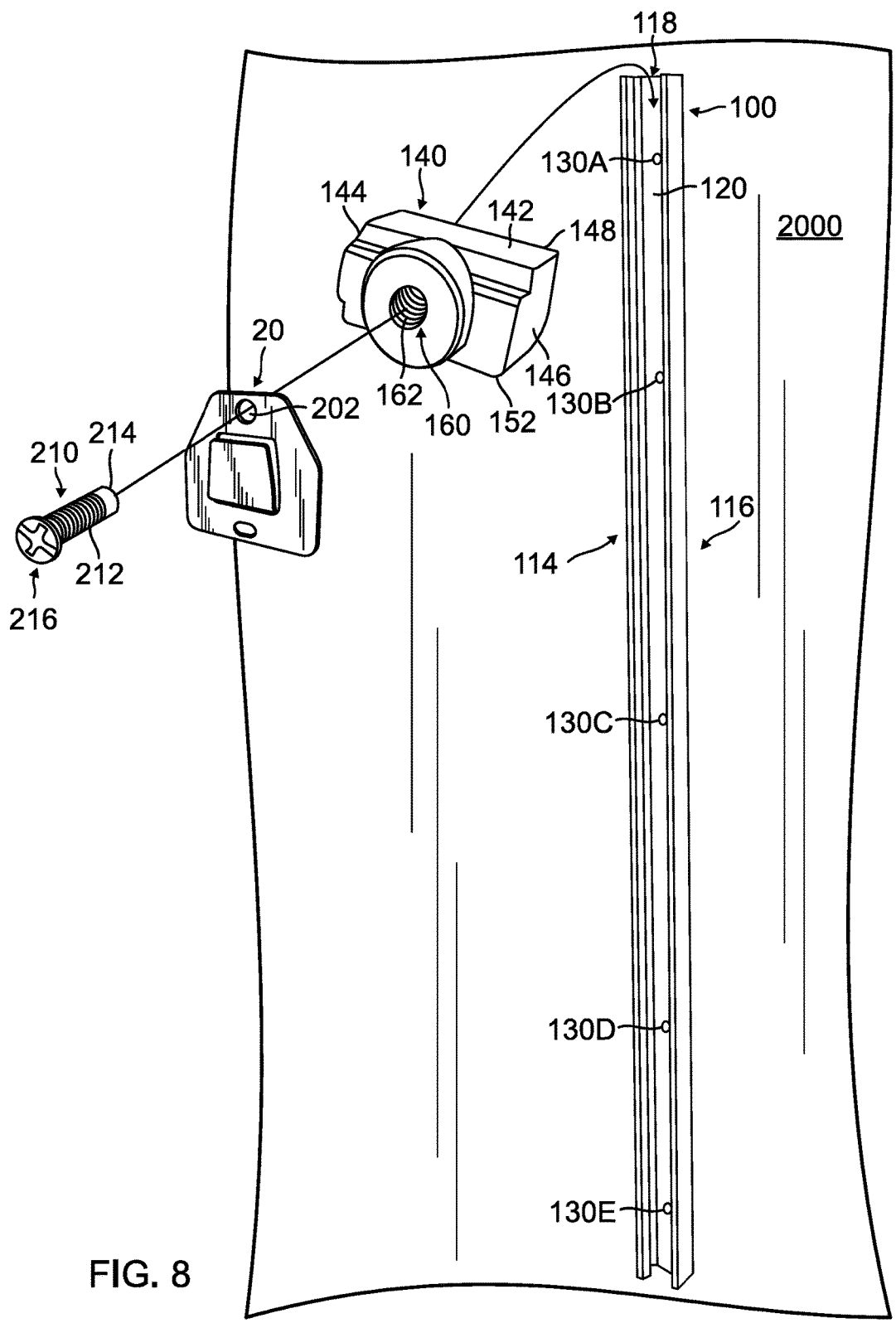
FIG. 8 is a front elevational exploded view of a threaded bolt, male mounting plate, channel nut, channel bracket, and wall.
Figure 9:
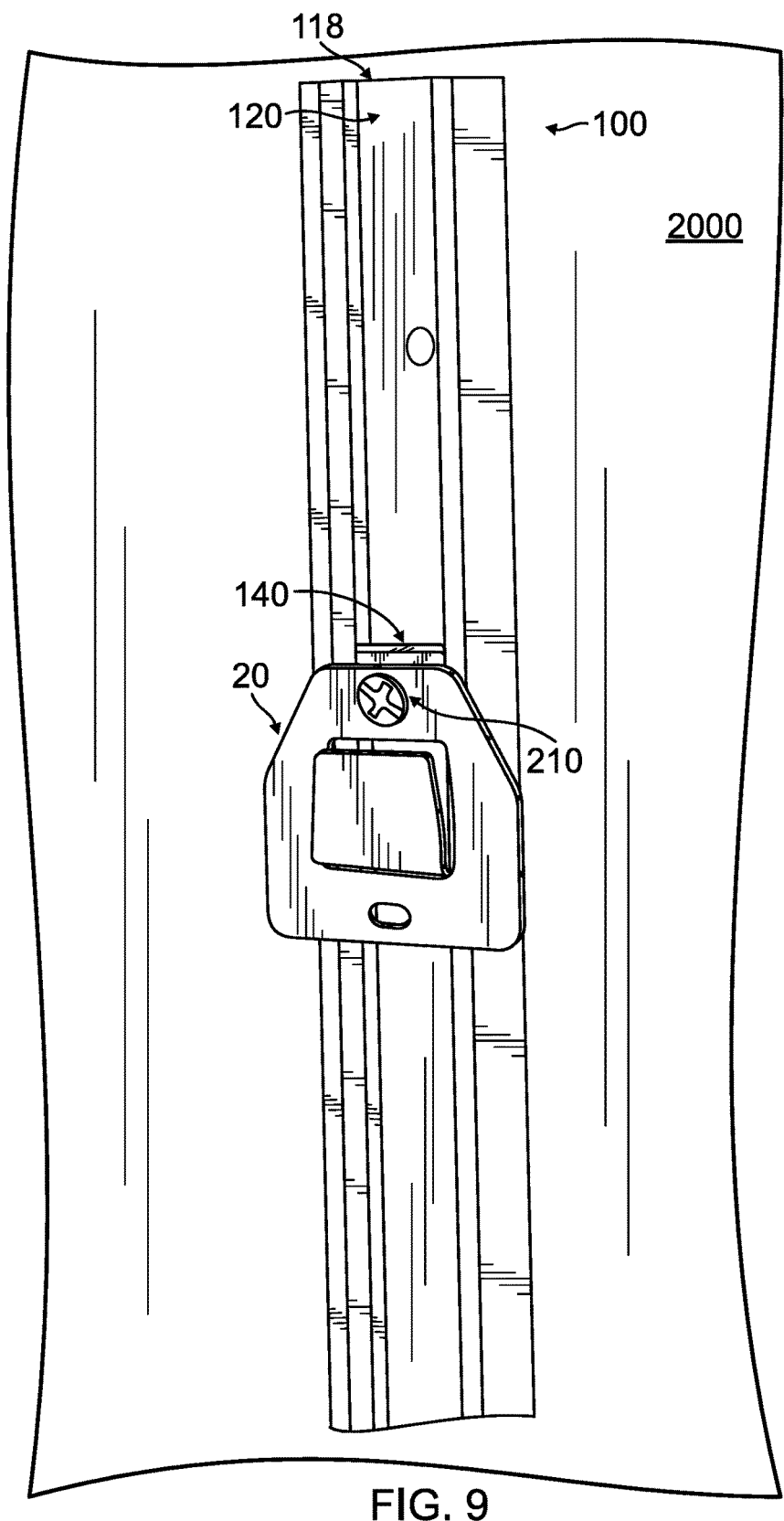
FIG. 9 is a front elevational perspective view of the adjustable male mounting plate affixed by channel nut and threaded bolt to a channel bracket on a wall.

FIGS. 8, 9, and 10 illustrate another embodiment of the present invention showing male mounting plate 20 working in conjunction with channel nut 140 and male mounting plate 20 being moveably affixed to a channel bracket 100 with channel bracket 100 being affixed to wall 2000.

Referring to FIG. 8, there is illustrated an embodiment with a channel nut 140 working in conjunction with channel bracket 100 that is affixed to wall 2000. Channel bracket 100 has a rear surface 120 which has a multiplicity of openings such as 130A, 130B, 130C, 130D, 130E, etc., with at least one opening on the top of channel bracket 100 and one opening on the bottom of channel bracket 100 which are used to affix channel bracket 100 to wall 2000 by affixing members such as screws, bolts, or other similar fastening members. The screws can be one way screws, metal screws, or wood screws, but should be designed to accommodate the wall the channel bracket that it is being affixed to.

Further referring to FIG. 8, channel nut 140 has a nut first sidewall 144, a nut second sidewall 146, a nut top wall 142, a nut bottom wall 152, a nut rear wall 148, and a threaded hole 160. When channel nut 140 is placed inside of interior chamber 118 of channel bracket 100, nut first sidewall 144 is adjacent and slides against first sidewall 114, nut second sidewall 146 is adjacent and slides against second sidewall 116, and nut rear wall 148 is adjacent and slides against' rear surface 120 of channel bracket 100.

Referring to FIG. 8 through 10, rear surface 120 of channel bracket 100 connects to a pair of oppositely disposed sidewalls: first sidewall 114 and a second sidewall 116. First sidewall 114 and second sidewall 116 extend and then curve approximately 180 degrees at a distal end to form a first flange 124 and a second flange 126 respectively. First flange 124 and second flange 126 curve inward toward the center of channel bracket 100 forming an interior chamber 118 that channel nut 140 can slide within.

Referring to FIGS. 8 and 10, there is illustrated male mounting plate 20 with top hole 202 that is retained to channel nut 140 by channel nut bolt 210. Channel nut bolt 210 fits through top hole 202 and then affixes to channel nut 140 when exterior threads 212 are screwed into interior threads 162 of channel nut 140. Male mounting plate 20 can then be moved vertically within interior chamber 118 of channel bracket 100 until a desired vertical height is reached as shown in FIG. 10. Once a desired vertical height is reached, channel nut bolt 210 can be used to retain male mounting plate 20 at the desired height by rotating head 216 of channel nut bolt 210 with a screw driver until threaded bolt end 214 has passed entirely through top hole 210 and threaded hole 160. Then male mounting plate 20 may be retained by tightening channel nut bolt 210 until a force greater than the weight of the mounting bracket and fan is being applied to rear surface 120 by threaded bolt end 214. The user then has the ability to raise or lower the fan simply by loosening channel nut bolt 210 to release some of the pressure being applied by threaded bolt end 214 and move the mounting plate to the new desired location and tighten channel nut bolt 210.

FIGS. 11, 12, 13, and 14 illustrate male mounting plate 20 working in conjunction with channel nut with circular aligner 180 and male mounting plate 20 which are moveably affixed to channel bracket 100 with channel bracket 100 being affixed to wall 2000. Referring to FIG. 11 there is illustrated a cross sectional view of channel bracket 100 working in conjunction with circular spacer channel nut 180 and male mounting plate 20. Further illustrated in FIG. 11 is circular spacer channel nut 180 placed inside of interior chamber 118 of channel bracket 100. Also shown in this figure is channel nut bolt 210 which can be tightened to affix male mounting plate 20 to a desired vertical location along channel bracket 100.

Figure 12:
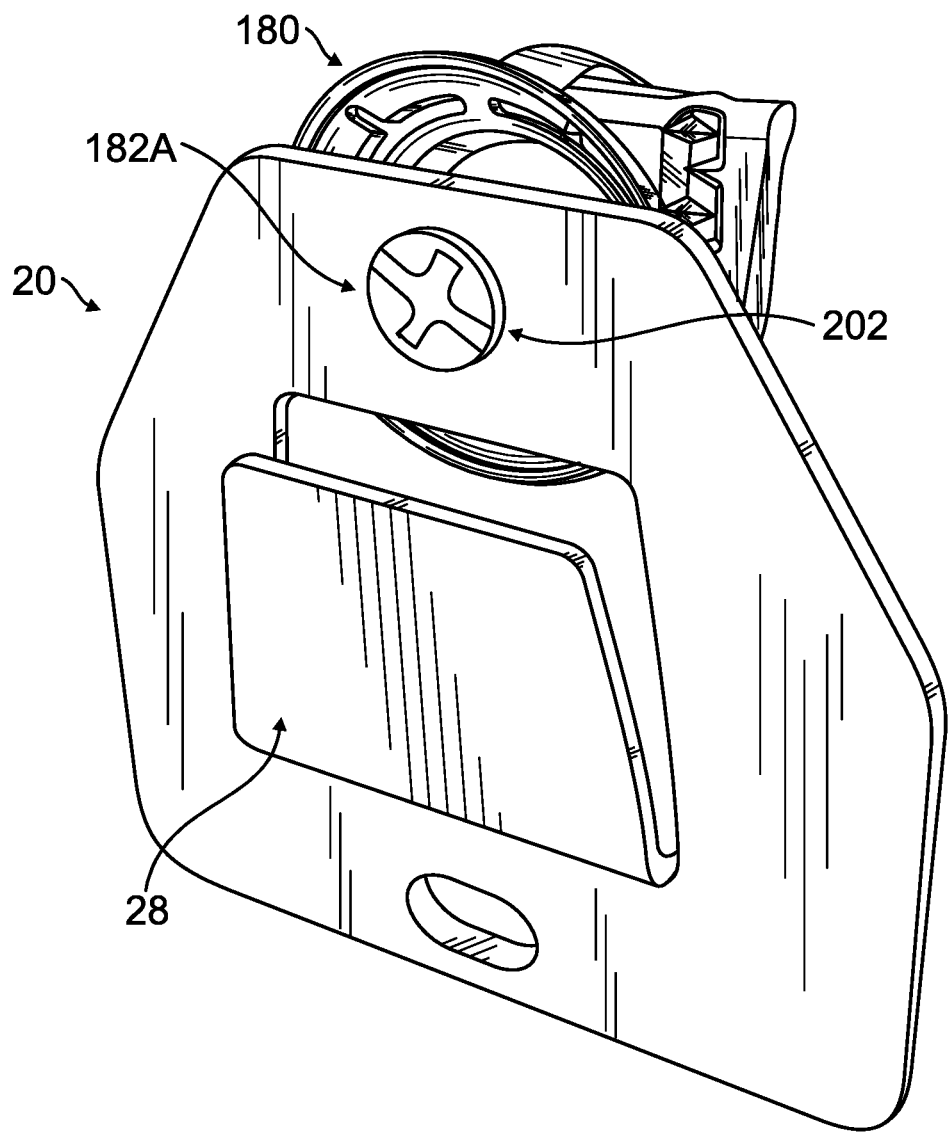
FIG. 12 is an enlarged perspective view of the adjustable male mounting plate, circular spacer channel nut, and threaded bolt.

Referring to FIG. 12, there is illustrated an enlarged view of male mounting plate 20 with male retaining member 28 being affixed to circular spacer channel nut 180 by channel nut bolt 210 fitting through top hole 202 of male mounting plate 20.

Figure 13:
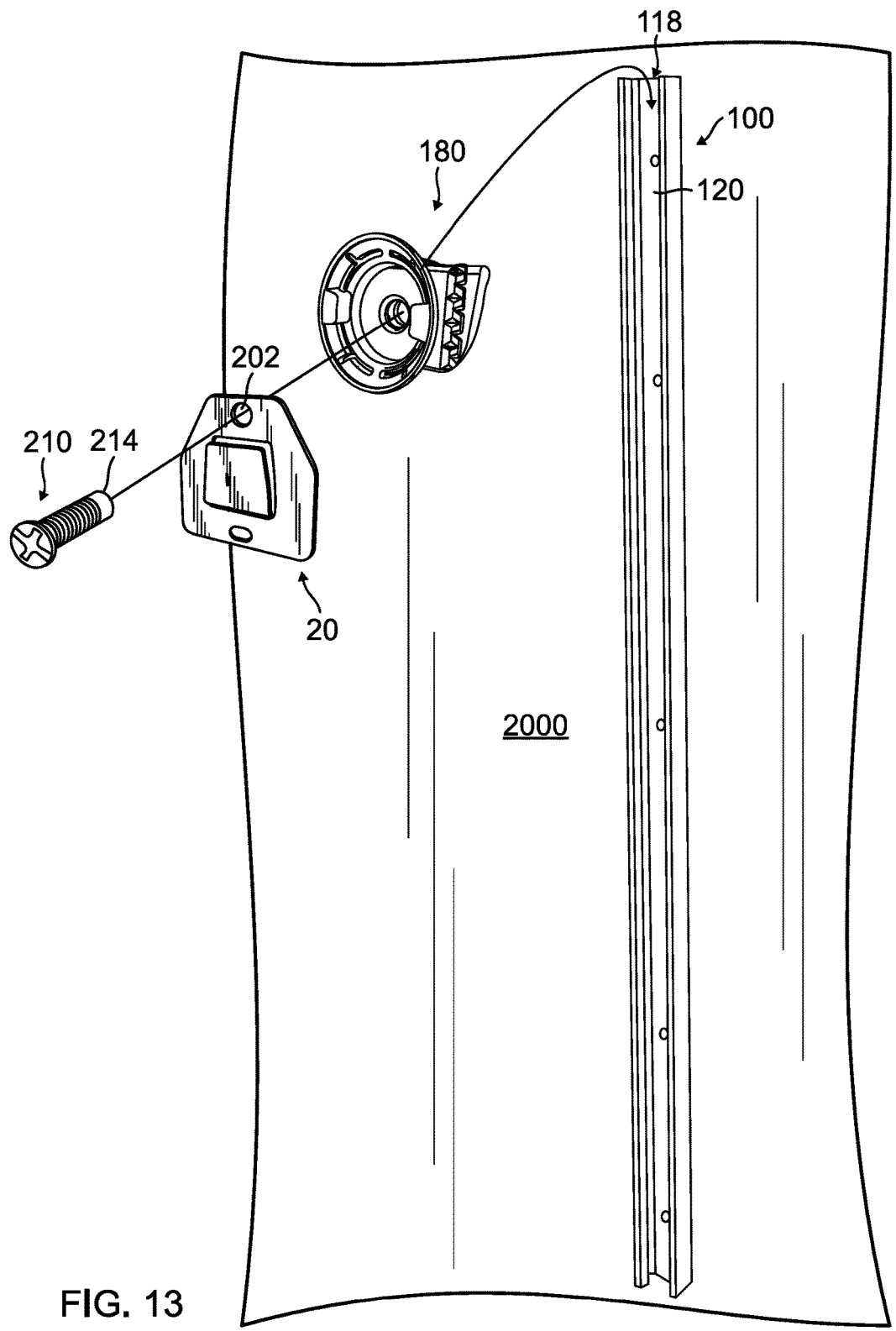
FIG. 13 is a front elevational perspective exploded view of a threaded bolt, male mounting plate, circular spacer channel nut, channel bracket, and wall.
Figure 14:
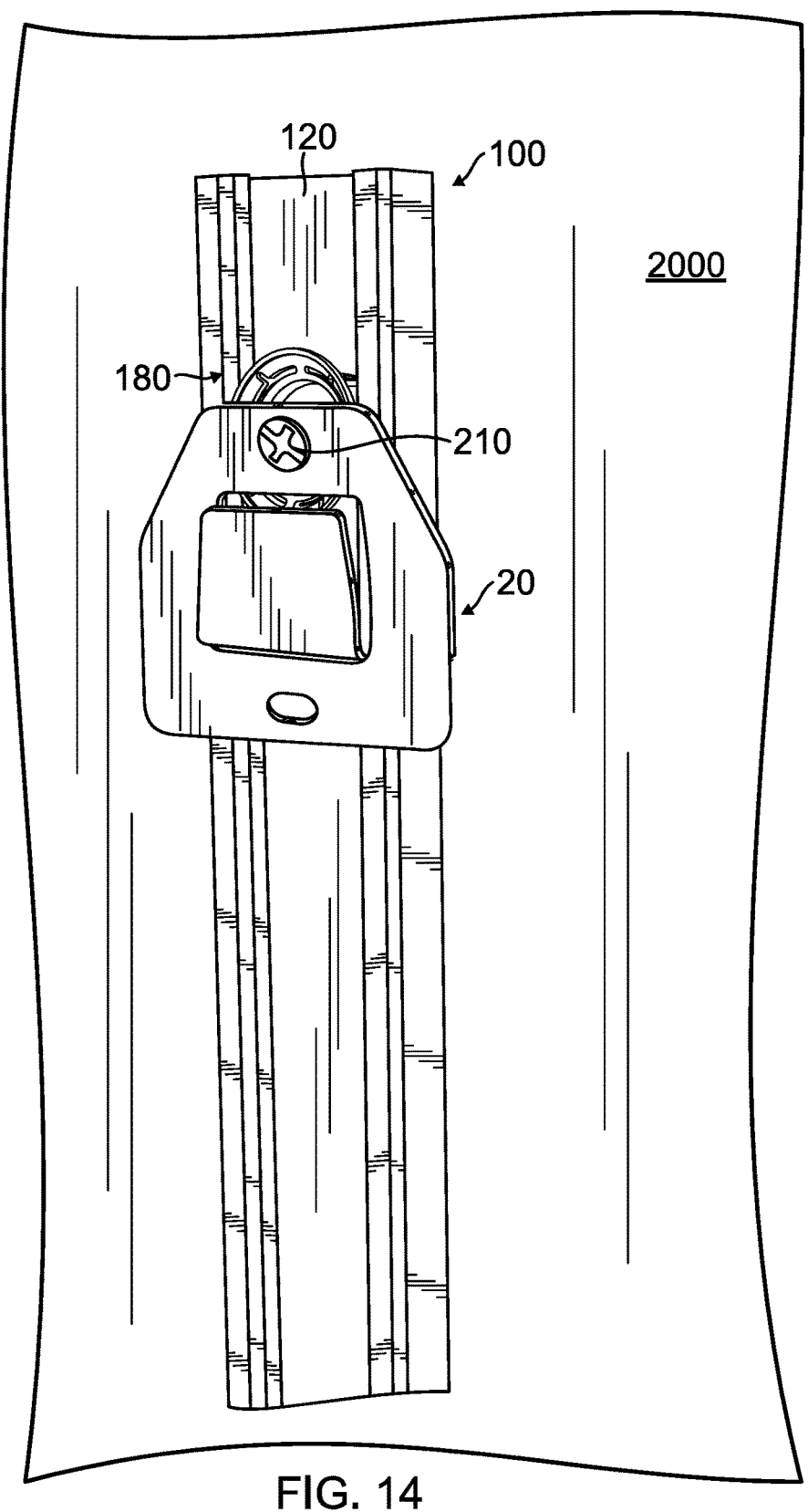
FIG. 14 is a front elevational perspective view of the male mounting plate affixed by threaded bolt and adjustable channel nut with aligner to a channel bracket on a wall.

Referring to FIG. 13, there is illustrated an exploded view of how male mounting plate 20 is affixed to a desired location along channel bracket 100 by use of channel nut bolt 210, circular spacer channel nut 180, and wall 2000. Similar to previously disclosed embodiment in FIG. 8, male mounting plate 20 can be affixed to a desired elevation (or location if the channel bracket is affixed horizontally along a wall) along channel bracket 100 which is affixed to wall 2000 as shown in FIG. 14.

Figure 15A:
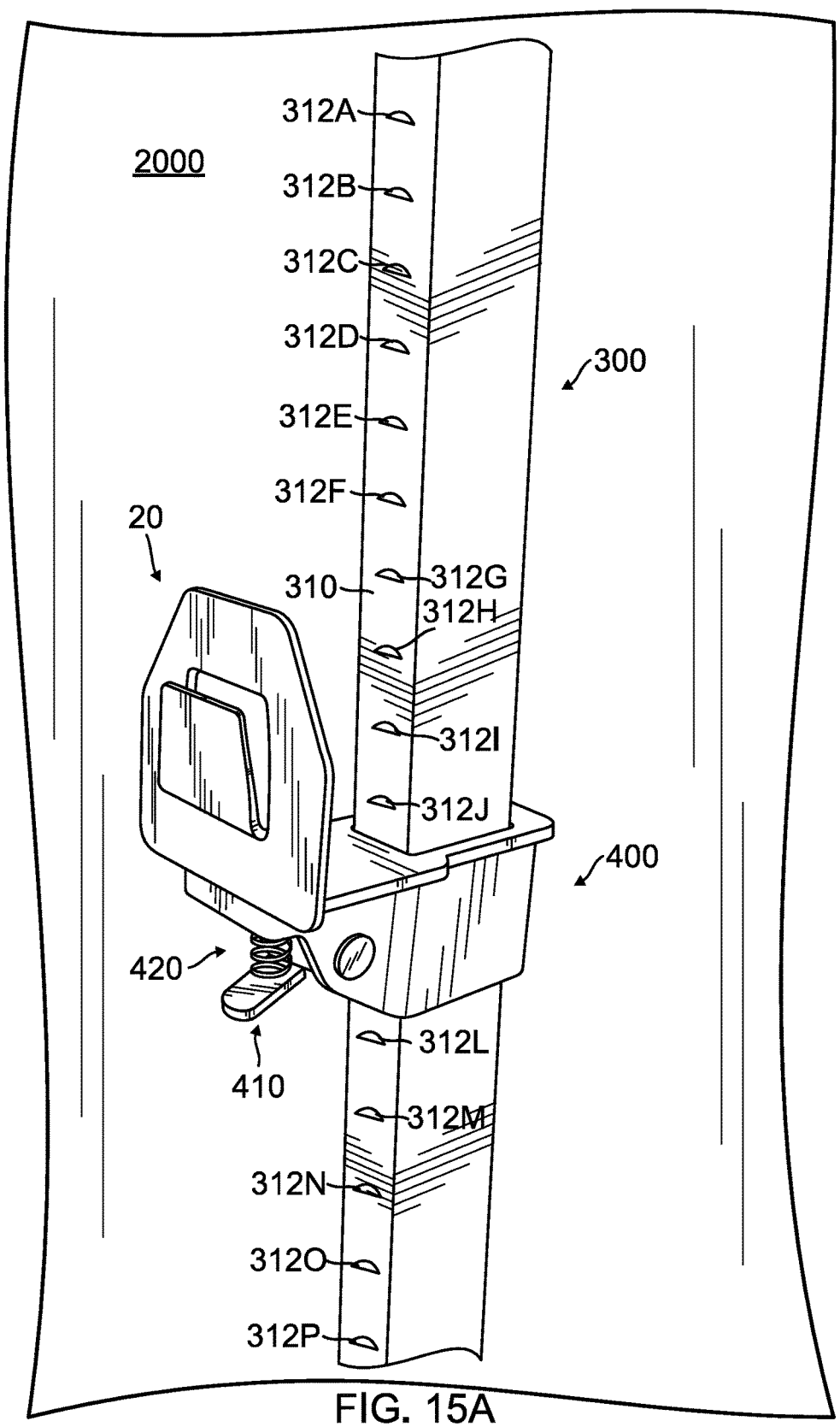
FIG. 15A is a front elevational perspective view of the male mounting plate affixed by an adjustable rectangular clutch to a rectangular tube.
Figure 15B:
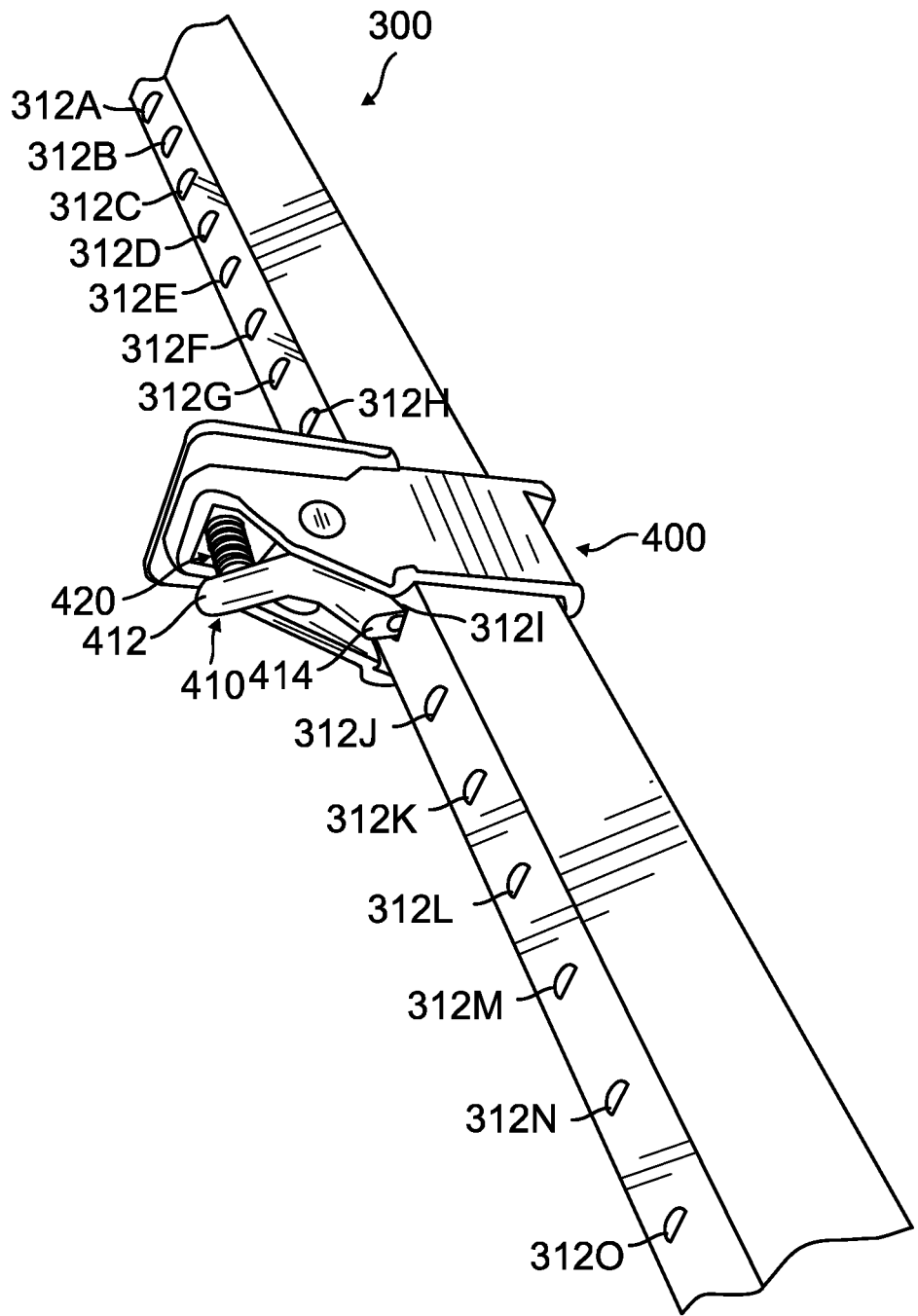
FIG. 15B is a bottom elevational perspective view of the adjustable rectangular clutch without the male mounting plate showing trigger pin and release contact end of adjustable rectangular clutch.

Referring to FIGS. 15A and 15B, there is illustrated a rectangular tube 300 that is working in conjunction with a rectangular clutch 400. Also illustrated are dimple notches 312A, 312B, 312C, 312D, 312E, 312F, 312G, 312H, 312I, 312J, 312K, 312L, 312M, 312N, 312O, and 312P located on rectangular exterior surface 310 of rectangular tube 300. Rectangular clutch 400 is rigidly affixed to male mounting plate 20. A user can raise or lower rectangular clutch 400 and male mounting plate 20 along rectangular tube 300 by pressing trigger pin 410. When the desired location or elevation is selected, trigger pin 410 can be released. Trigger pin 410 has a handle 412 that when pressed causes compression spring 420 to compress and release contact end 414 of clutch 400 to be released and no longer in contact with rectangular exterior surface 310 of rectangular tube 300. Release contact end 414 is designed to fit into dimple notches 312 A through 312 P.

Figure 16A:
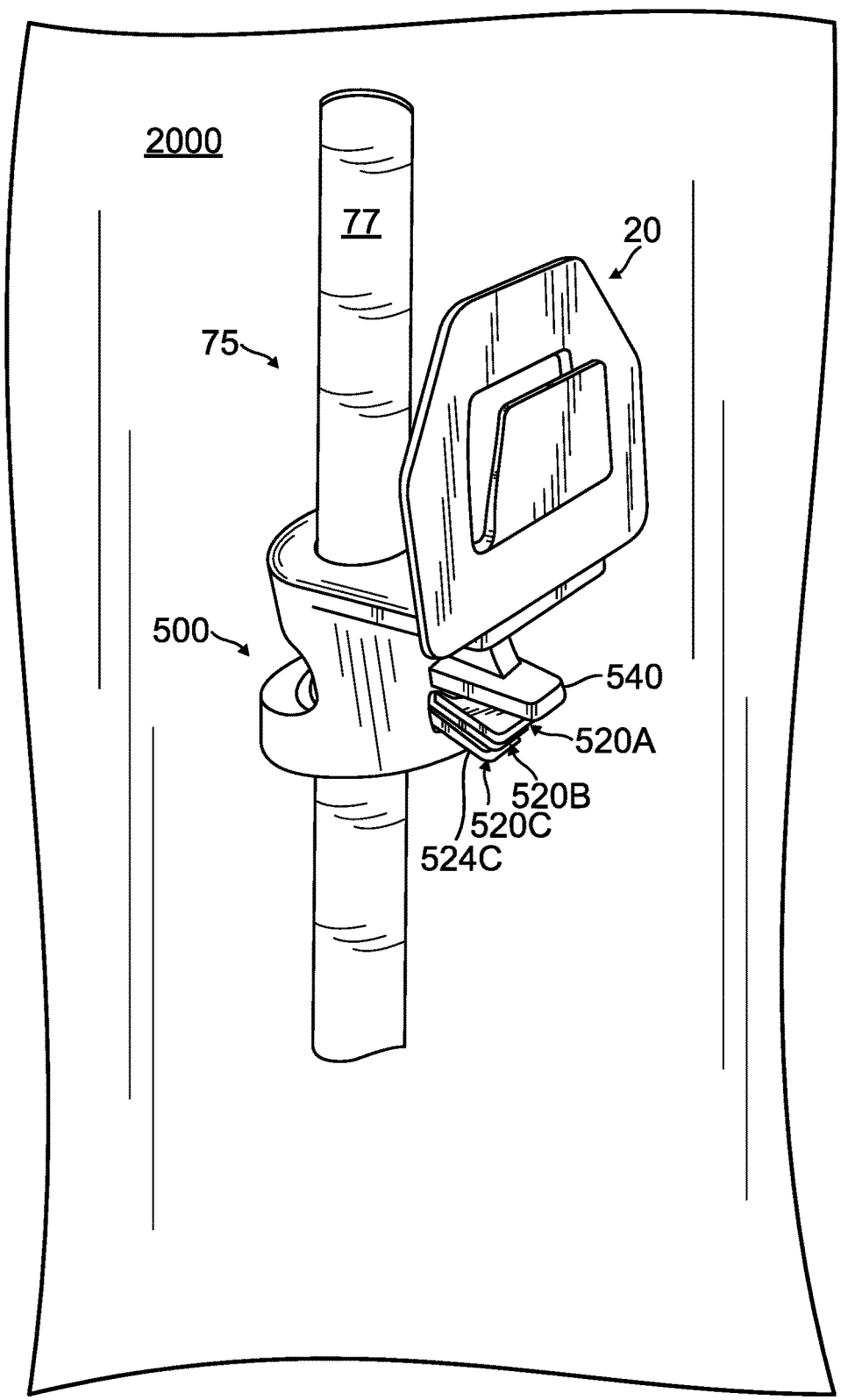
FIG. 16A is a front elevational perspective view of the adjustable male mounting plate affixed by a circular clutch to a circular tube.
Figure 16B:
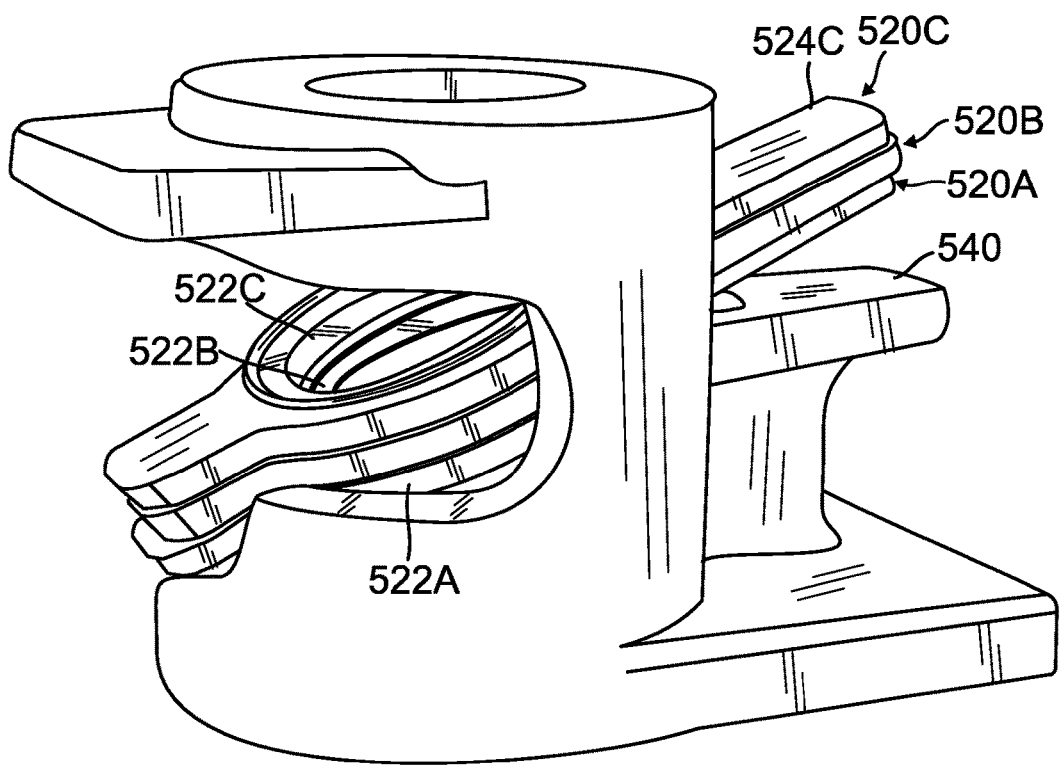
FIG. 16B is an inverted side perspective view of the adjustable circular clutch with bottom facing up to expose clutch discs inside of circular clutch.

When trigger pin 410 is pressed rectangular clutch 400 and male mounting plate 20 can move freely move along rectangular tube 300. When the new location is selected, trigger pin is released and release contact end is positioned to rest within one of the above disclose dimple notches (312 A through 312 P). Referring to FIGS. 16A and 16B there is illustrated circular tube 75 that works in conjunction with a circular clutch or [Clutch-discs (end spring)] 500, male mounting plate 20, and wall 2000. Circular clutch 500 is rigidly affixed to male mounting plate 20. A user can raise or lower circular clutch 500 and male mounting plate 20 along circular tube 75 by use of three circular clutch-discs (520A, 520B, and 520C). When top end 524A of clutch-disc 520A is pressed, clutch-discs (520A, 520B, and 520C) move together in unison and the angle between the clutch-discs (520A, 520B, and 520C) and clutch platform 540 is decreased or made closer to zero. This allows circumferential endwalls 522A, 522B, and 522C respectively on clutch-discs (520A, 520B, and 520C) to become closer to having the angle between the circumferential endwalls and clutch platform be equal to 90 degrees. As this angle becomes closer to 90 degrees the smaller the friction force that is applied to circular tube 75 from circumferential endwalls 522A, 522B, and 522C.

In the initial resting condition without pressing circular clutch 500 can move freely upwards but not downwards along circular tube 75. When top end 524A of clutch-disc 520A is pressed, as discussed in more detail in the previous paragraph, circular clutch 500 can move freely both upwards and downwards along circular tube 75. When the desired location or elevation is selected then bottom end 524C of clutch-disc 520C is released and circular clutch 500 is prevented from moving downwards by the force from circumferential end walls 522A, 522B, and 522C respectively on exterior circumferential sidewall 77 which causes male mounting plate 20 to be affixed to a new location along circular tube 75.

The embodiments for the present invention for the adjustable male mounting plate 20 working in conjunction with wall mounted structures: channel bracket 100, circular tube 75, or rectangular tube 300 and each wall mounted structure's respective level adjusting member, all perform the same end function of adjustably retaining female mounting plate 60 and fan 120 to a multitude of locations along a wall or mounting surface. The different embodiments disclosed herein though have different methods for the level adjusting members (top retaining cylinder 40 and bottom retaining cylinder 50, rectangular clutch 400, and circular clutch 500) and the wall mounted structures (channel bracket 100, circular tube 75, and rectangular tube 300). Nevertheless, every embodiment disclosed has female retaining member 70 of female mounting plate 60 and male retaining member 28 of male mounting plate 20 used to adjoin male retaining member 28 to female retaining member 70.

Figure 17:
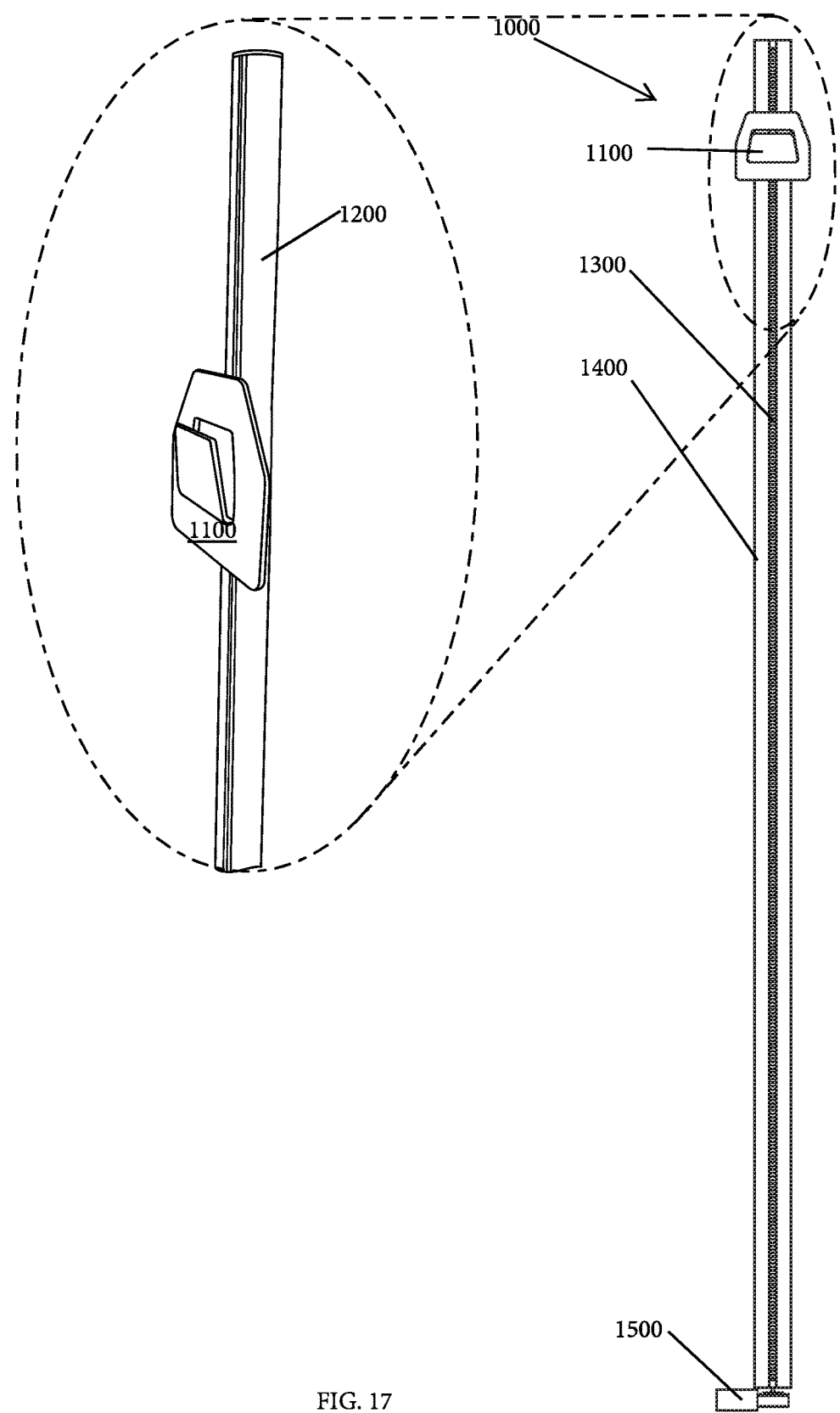
FIG. 17 is a perspective view of a motorized adjustable male mounting plate.
Figure 18:
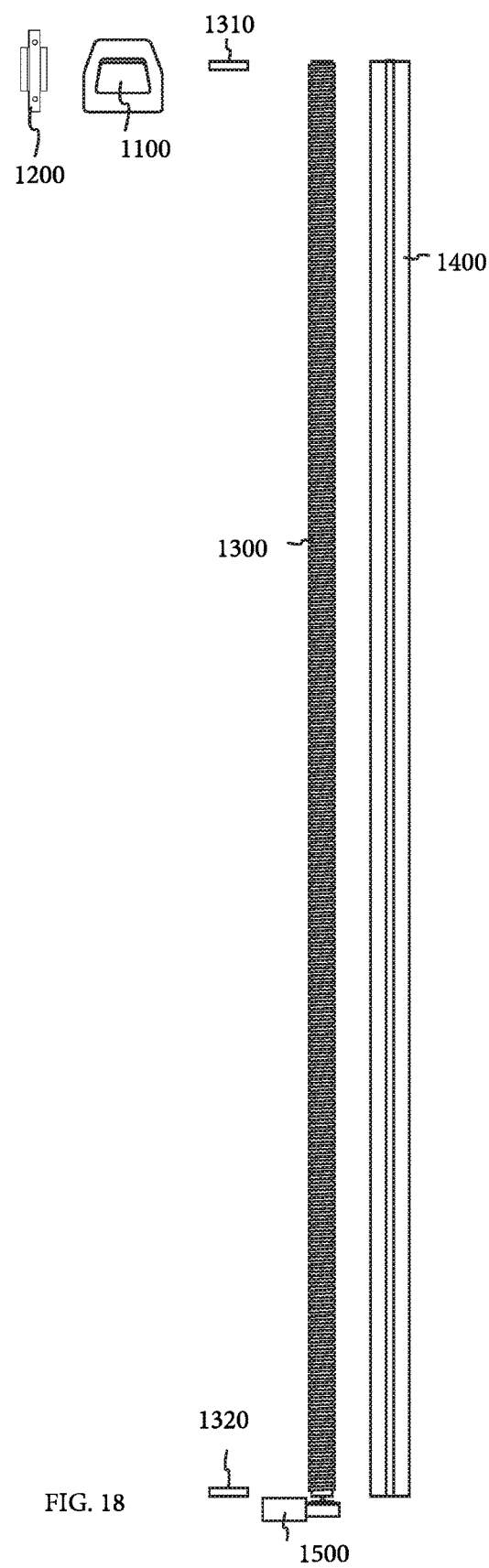
FIG. 18 is an exploded view of the motorized adjustable male mounting plate of FIG. 17.

FIG. 17 is a perspective view of a motorized adjustable male mounting plate. FIG. 18 is an exploded view of the motorized adjustable male mounting plate of FIG. 17. FIGS. 17 and 18 illustrate another embodiment 1000 of the present invention showing male mounting plate 1100 working in conjunction with a nut 1200 on a motorized screw rod 1300 operating within a slotted post 1400. As shown, a motor 1500 is disposed at the bottom of the slotted post 1400 and configured to rotate the screw rod 1300 within said post 1400. Referring to FIG. 18, the screw rod is rotatably disposed within the post 1400 by bearings 1310, 1320 located at the ends of said post. As discussed in greater detail below, the nut 1200 is configured to interact with the screw rod 1300 during rotation of said screw rod 1300 so that the nut 1200 and face plate 1100 move upward or downward along the post to adjust the height of a fan (not shown). In one embodiment, the motor 1500 is a right angle motor with Bluetooth® or other wireless connectivity so that the motor may be operated wirelessly via smartphone or other portable device.

Figure 19A:
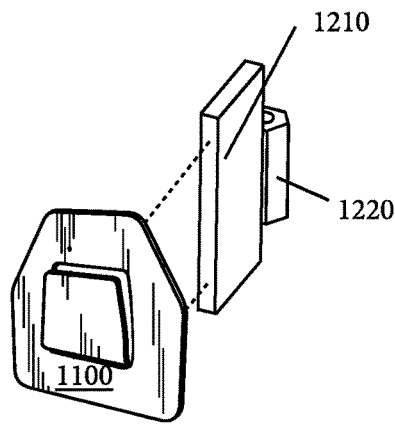
FIG. 19A is a perspective view of the assembly of the mounting plate and a nut.
Figure 19B:
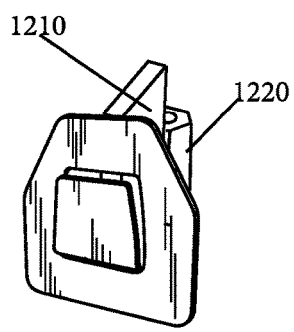
FIG. 19B is a perspective view of a completed assembly of the mounting plate and nut of FIG. 19A.
Figure 20A:
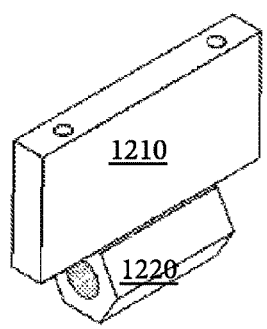
FIG. 20A is a perspective view of the nut.
Figure 20B:
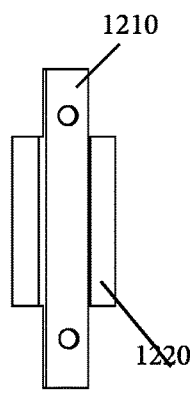
FIG. 20B is a front view of the nut.
Figure 20C:
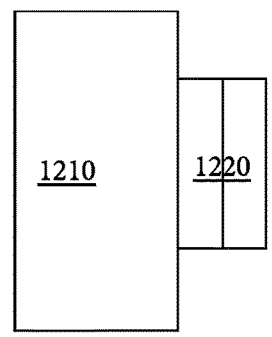
FIG. 20C is a side view of the nut.
Figure 20D:
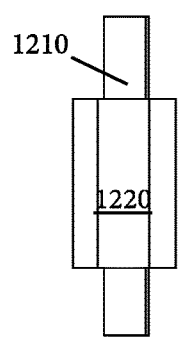
FIG. 20D is a rear view of the nut.
Figure 20E:
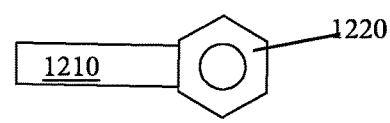
FIG. 20E is a top or bottom view of the nut.

FIG. 19A is a perspective view of the assembly of the mounting plate 1100 and a nut 1200. FIG. 19B is a perspective view of a completed assembly of the mounting plate and nut of FIG. 19A. The mounting plate 1100 is suitably constructed as described above in connection with the earlier figures. FIG. 20A through 20E respectively show perspective, front, side, rear and top views of the nut 1200. As shown, the nut is defined by a hex nut 1210 welded to a neck 1220. Referring to FIGS. 19A and 19B, the face plate 1100 may be welded or otherwise adhered to the neck 1210 of the nut 1200. The face plate 1100 could also be screwed or otherwise affixed to the neck 1210 of the nut 1200. As discussed later below, the neck may be disposed in the slot 1410 of the slotted post 1400 so that the nut 1200 is positioned inside of the post 1400 while the face plate 1100 is disposed on the outside of the post 1400 (see FIG. 18).

Figure 21:
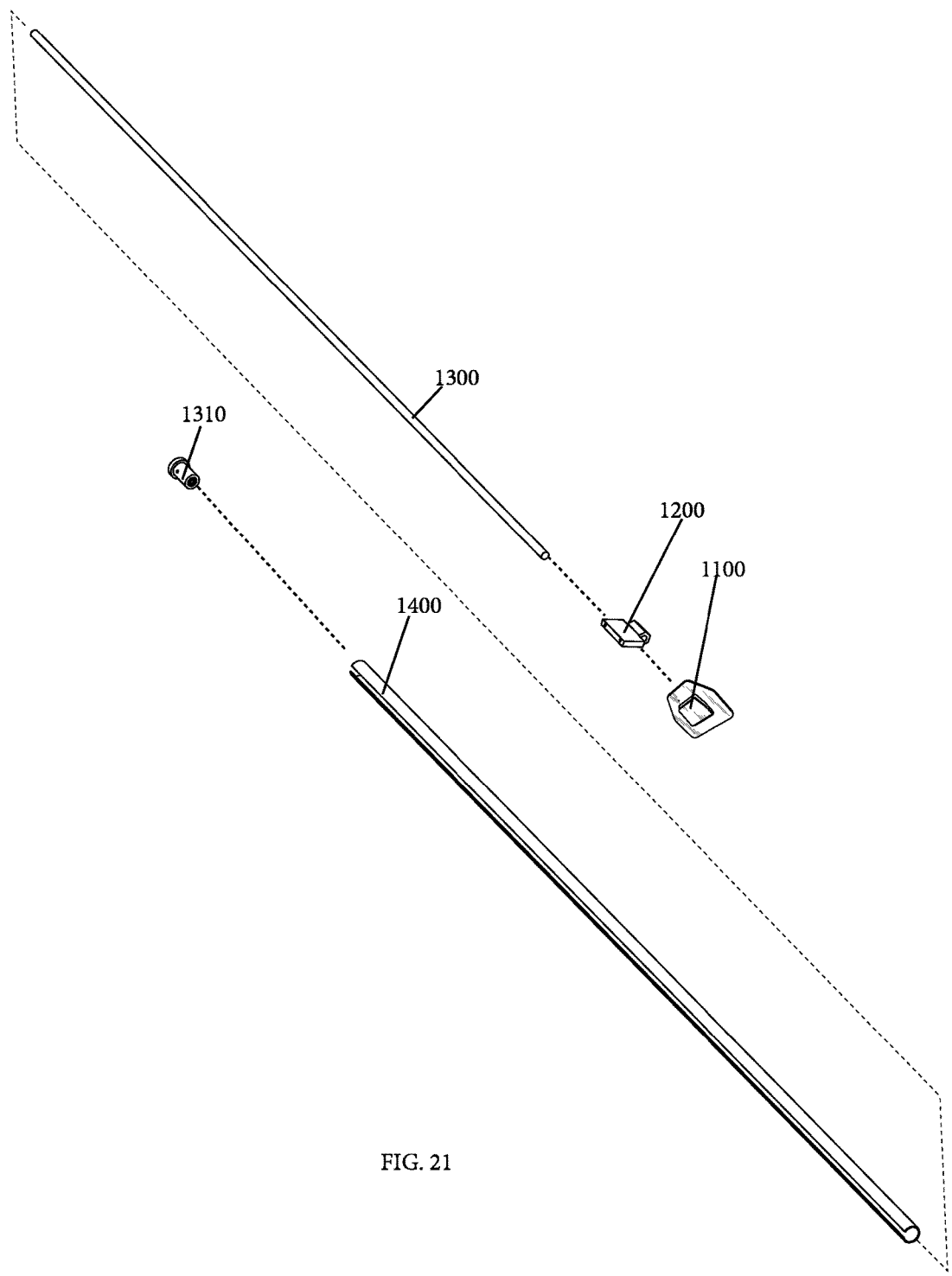
FIG. 21 is an assembly flow of the motorized adjustable male mounting plate of FIGS. 17 and 18.

FIG. 21 is a partial assembly flow of the motorized adjustable male mounting plate of FIGS. 17 and 18. As shown, the face plate 1100 and the nut 1200 may be assembled and associated with the threaded or screw rod 1300. The sub assembly of the faceplate 1100, nut 1200, and screw rod 13000 may be provided to within the slotted post 1400 so that the faceplate 1100 is on the outside of the post 1400, the neck 1210 of the nut 1200 is provided through the slot 1410 of the post 1400, and the nut 1200 and threaded rod 1300 are disposed on the inside of the post 1400. Finally, bearings may be used to cap the ends and put the threaded rod 1300 in rotatable connection to the post. Although, not shown in the figure, the motor 1500 may be mechanically coupled to the threaded rod 1300. In one embodiment, the threaded rod may be a spindle of five sixteenths of an inch while the hex nut is also five sixteenths of an inch.

Figure 22A:
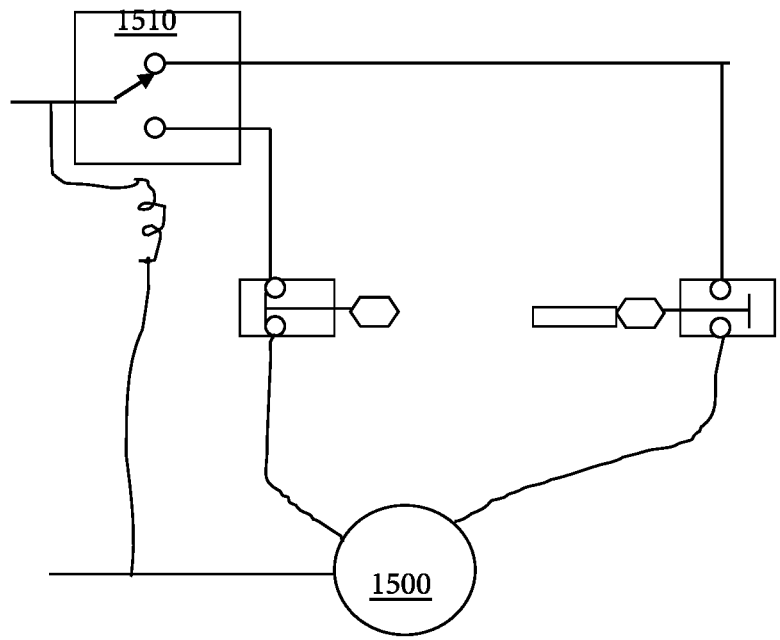
FIG. 22A is a diagram of the motor electronics of the motorized adjustable male mounting plate; and, FIG. 22B is another diagram of the motor electronics of the motorized adjustable male mounting plate.
Figure 22B:
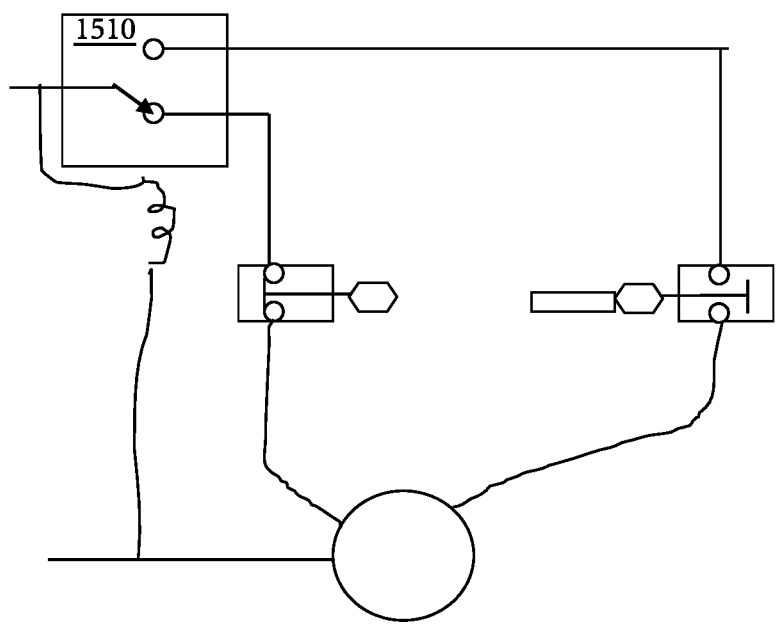

As described above, the motor may be operated to turn the screw or threaded rod 1300 within the post 1400 relative to the nut 1200 so that the nut may move along the post 1400. In one embodiment, the motor 1500 may be turned on and off wirelessly via off-the-shelf, Bluetooth® software on-off and up or down commands. In one embodiment, the software is installed on a smartphone and includes functionality for controlling the motor 1500 on a single post 1400 or a plurality of motors on a plurality of posts 1400 at once (e.g., as may be common to large greenhouses). Suitably, the system 1000 may be outfitted with limit switches designed to kill the motor whenever the nut 1200 has reached a maximum or minimum height along the post 1400. FIGS. 22A and 22B are diagrams of the motor 1500 electronics, including the limit switches. As shown in the figures, the motor is coupled to a latching relay 1510 that prevents the motor 1500 from operating to raise the nut 1200 when it has attained a max height and from lowering the nut 1200 when it has attained a minimum height.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

PAPER "SEQUENCE LISTING"

Not applicable.

I claim:
1. An system to provide air circulation via a fan where said fan has a female retaining member, said system comprising:
  a mounting plate comprising a male retaining member;
  a nut comprising a hexnut and neck;
  a screw rod disposed within a post with a slot;
  a motor for turning the screw rod relative to the post;
  where the post is positioned upright in an area growing plants;
  where said screw rod is provided through the hexnut of the nut so that the neck of the nut is disposed within the slot;
  where said hexnut moves along the screw rod and said neck correspondingly moves along said slot when the motor turns relative to the post; and,
  where said mounting plate is secured to the neck of the nut and said male retaining member is inserted into said female retaining member so that the mounting plate and fan move with the neck along said slot when the motor turns relative to the post.

2. The system of claim 1 where the motor has a wireless receiver and is operated wirelessly.

3. The system of claim 1 where the motor has a wireless receiver and is operated wirelessly via a smartphone including software is installed on the smartphone for sending commands to the wireless receiver of the motor.

4. The system of claim 1 further comprising limit switches designed to stop the turning of the motor whenever the neck of the nut has moved along the slot of the post to a designated extent.

5. An method of circulating air via a fan where said fan has a female retaining member, said method comprising the steps of:
uprightly positioning a post with a slot in an area for growing plants;
coupling a motor to a screw rod so that the screw rod turns when the motor is powered on;
securing a mounting plate to a neck of a nut;
installing the nut on the screw rod;
providing the screw rod to within the post so that (a) the neck of the nut is provided though the slot, (b) the mounting plate is disposed outside of the post, (c) the screw rod turns relative to the post when the motor is powered on, and (d) the nut moves along the screw rod while the neck of the nut moves along the slot and the mounting plate moves along the post whenever the screw rod is turned relative to the post;
inserting a male retaining member into the female retaining member so that the fan is installed on the mounting plate;
powering on the motor to move the nut along the screw rod while the neck of the nut moves along the slot and the mounting plate moves along the post; and,
powering off the motor.

6. The method of claim 5 where the motor has a wireless receiver and is operated wirelessly.

7. The method of claim 5 where the motor has a wireless receiver and is operated wirelessly via a smartphone including software is installed on the smartphone for sending commands to the wireless receiver of the motor.

8. The method of claim 5 further comprising limit switches designed to power off the motor whenever the neck of the nut has moved along the slot of the post to a designated extent.

9. The system of claim 1 wherein:
the mounting plate is a male mounting plate having a main male vertical plate which has a first male front surface, a first male rear surface, the male retaining member having a second male front surface and a second male rear surface extending away from said first male front surface at a given angle to create a central open chamber between said first male front surface of said main male vertical plate and said second male rear surface of said male retaining member.

10. The method of claim 5 wherein:
the mounting plate is a male mounting plate having a main male vertical plate which has a first male front surface, a first male rear surface, the male retaining member having a second male front surface and a second male rear surface extending away from said first male front surface at a given angle to create a central open chamber between said first male front surface of said main male vertical plate and said second male rear surface of said male retaining member.

\* \* \* \* \*